(12) United States Patent
Nojima (10) Patent No.: US 7,292,411 B2
(45) Date of Patent: Nov. 6, 2007

(54) DISK HEAD SUSPENSION ARM HAVING COMB RECEIVING PORTION

(75) Inventor: Akira Nojima, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 0 days.

(21) Appl. No.: 11/432,333

(22) Filed: May 11, 2006

(65) Prior Publication Data

US 2006/0215326 A1 Sep. 28, 2006

Related U.S. Application Data

(62) Division of application No. 10/132,822, filed on Apr. 24, 2002, now Pat. No. 7,088,554.

(30) Foreign Application Priority Data

Jun. 27, 2001 (JP) .............................. 2001-195420

(51) Int. Cl.
*G11B 5/48* (2006.01)
(52) U.S. Cl. .................. 360/244.9; 360/244.3
(58) Field of Classification Search ............. 360/244.2, 360/244.3, 244.9
See application file for complete search history.

(56) References Cited

U.S. PATENT DOCUMENTS

| | | | | |
|---|---|---|---|---|
| 4,175,275 A | * | 11/1979 | Schaefer ................. | 360/244.9 |
| 4,189,759 A | * | 2/1980 | Bauck et al. ............ | 360/244.9 |
| 4,996,616 A | * | 2/1991 | Aoyagi et al. .......... | 360/244.9 |
| 5,187,625 A | * | 2/1993 | Blaeser et al. .......... | 360/244.3 |
| 5,282,103 A | * | 1/1994 | Hatch et al. ............. | 360/245 |
| 5,296,983 A | * | 3/1994 | Blanc et al. ............. | 360/244.3 |
| 5,446,612 A | * | 8/1995 | Thornton et al. ........ | 360/244.9 |
| 5,543,985 A | * | 8/1996 | Donnelly et al. ........ | 360/244.9 |
| 5,650,894 A | * | 7/1997 | Ikeda ....................... | 360/244.3 |
| 5,719,727 A | * | 2/1998 | Budde ..................... | 360/244.9 |
| 5,777,826 A | * | 7/1998 | Tsuchida et al. ......... | 360/244.9 |

(Continued)

FOREIGN PATENT DOCUMENTS

JP 2000-149475 * 5/2000

*Primary Examiner*—Brian E. Miller
(74) *Attorney, Agent, or Firm*—Jordan and Hamburg LLP (57) ABSTRACT

A head suspension for a disk drive includes a base (5) to be attached to a carriage, a load beam (3) having a rigid part (9) and a resilient part (11) supported by the base, to apply load on a data read/write head (19) arranged at a front end of the rigid part, a flexure (7) attached to the load beam and being provided with the head, and a guide face (27) formed on an edge (9a) of the rigid part where a jig is inserted, to guide the jig without wearing away the jig. The guide face is formed by providing the edge of the rigid part with an integral thin part that is thinner than the rigid part and bending the thin part, or by partly removing the edge of the rigid part. The jig is inserted into a head suspension module, which is made by arranging the head suspension and other identical head suspensions at regular intervals, such that the teeth of the jig slide on the guide faces of the head suspensions to maintain spaces between the rigid parts of the head suspensions, to install the head suspension module into the disk drive such that the heads of the head suspensions face disks in the disk drive.

2 Claims, 12 Drawing Sheets

U.S. PATENT DOCUMENTS 6,104,572 A * 8/2000 Williams et al. ......... 360/244.9
6,141,187 A * 10/2000 Wong et al. ............. 360/244.8
6,441,998 B1 * 8/2002 Abrahamson ............... 360/137
6,594,115 B2 * 7/2003 Takagi et al. ............... 360/245
6,636,382 B2 * 10/2003 Shiraishi .................. 360/244.3

* cited by examiner

DISK HEAD SUSPENSION ARM HAVING COMB RECEIVING PORTION

REFERENCE TO RELATED APPLICATION

This is a divisional application of Ser. No. 10/132,822, filed Apr. 24, 2002 now U.S. Pat. No. 7,088,554, which is currently allowed. The subject matter of the aforementioned prior application is hereby incorporated herein by reference.

BACKGROUND OF THE INVENTION

1. Field of the Invention

The present invention relates to a head suspension for a disk drive installed in an information processing apparatus such as a personal computer.

2. Description of the Related Art

A hard disk drive (HDD) records and reproduces information to and from rotating magnetic or magneto-optical disks. The disks are supported with a carriage that is turned around a spindle by a positioning motor.

An example of the carriage is disclosed in U.S. Pat. No. 4,167,765. The carriage of this disclosure includes a carriage arm, a head suspension attached to a front end of the carriage arm, a head attached to the head suspension, and a slider attached to the head. The slider faces a disk. When the disk is rotated at high speed, the slider slightly floats from the disk, and an air bearing is formed between the disk and the slider.

Figure 1:
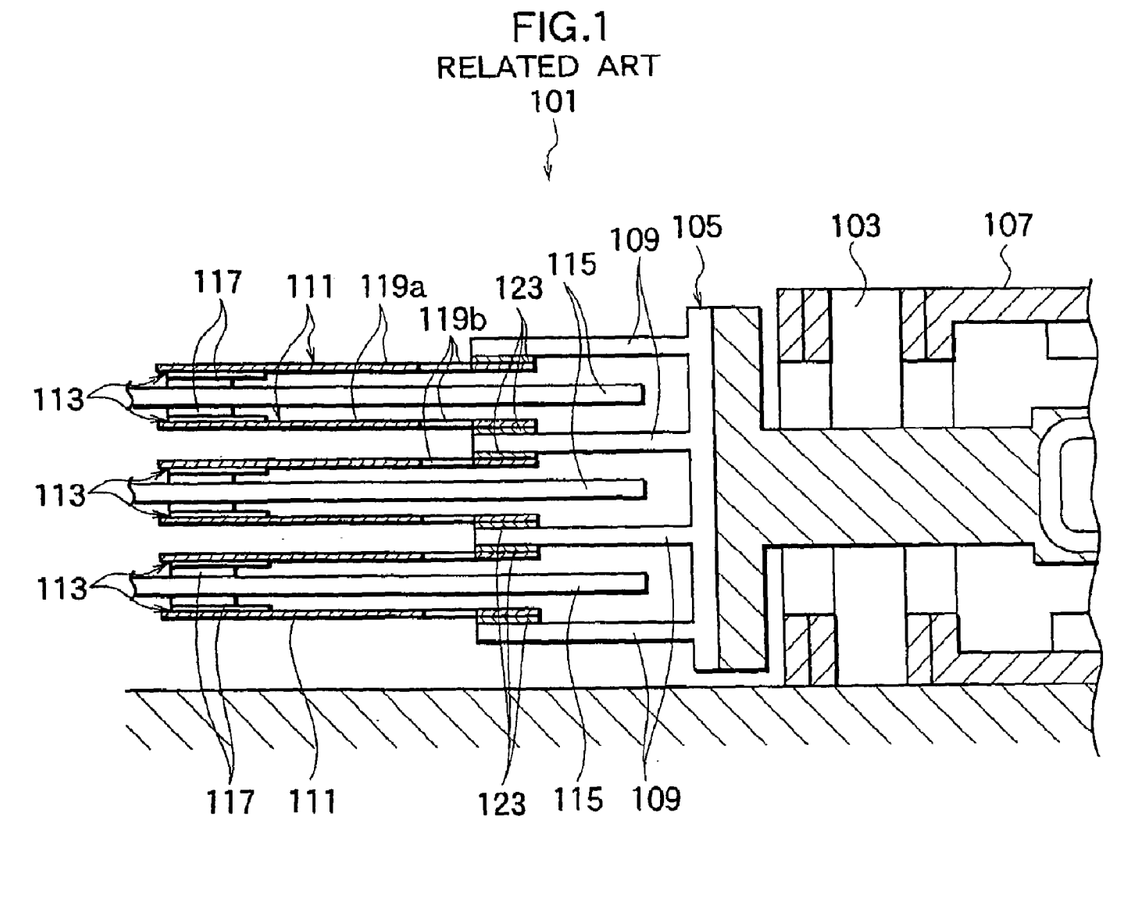
FIG. 1 is a sectional view partly showing head suspensions installed in a hard disk drive according to a related art.

FIG. 1 is a sectional view partly showing a hard disk drive having head suspensions according to a related art. The disk drive 101 has a carriage 105 that is turned around a spindle 103 by a positioning motor 107 such as a voice coil motor. The carriage 105 has a plurality of (four in FIG. 1) carriage arms 109, a head suspension 111 attached to a front end of each carriage arm 109, and a head 113 attached to a front end of each head suspension 111.

The carriage 105 is turned around the spindle 103, to move the heads 113 onto a target track on disks 115. Each head 113 includes a slider 117 to be positioned onto a target track on the disk 115 and a transducer (not shown) supported with the slider 117.

When the disks 115 are rotated at high speed, air enters between the disks 115 and the sliders 117 to slightly float the sliders 117 from the disks 115 and form air bearings between them.

Figure 2:
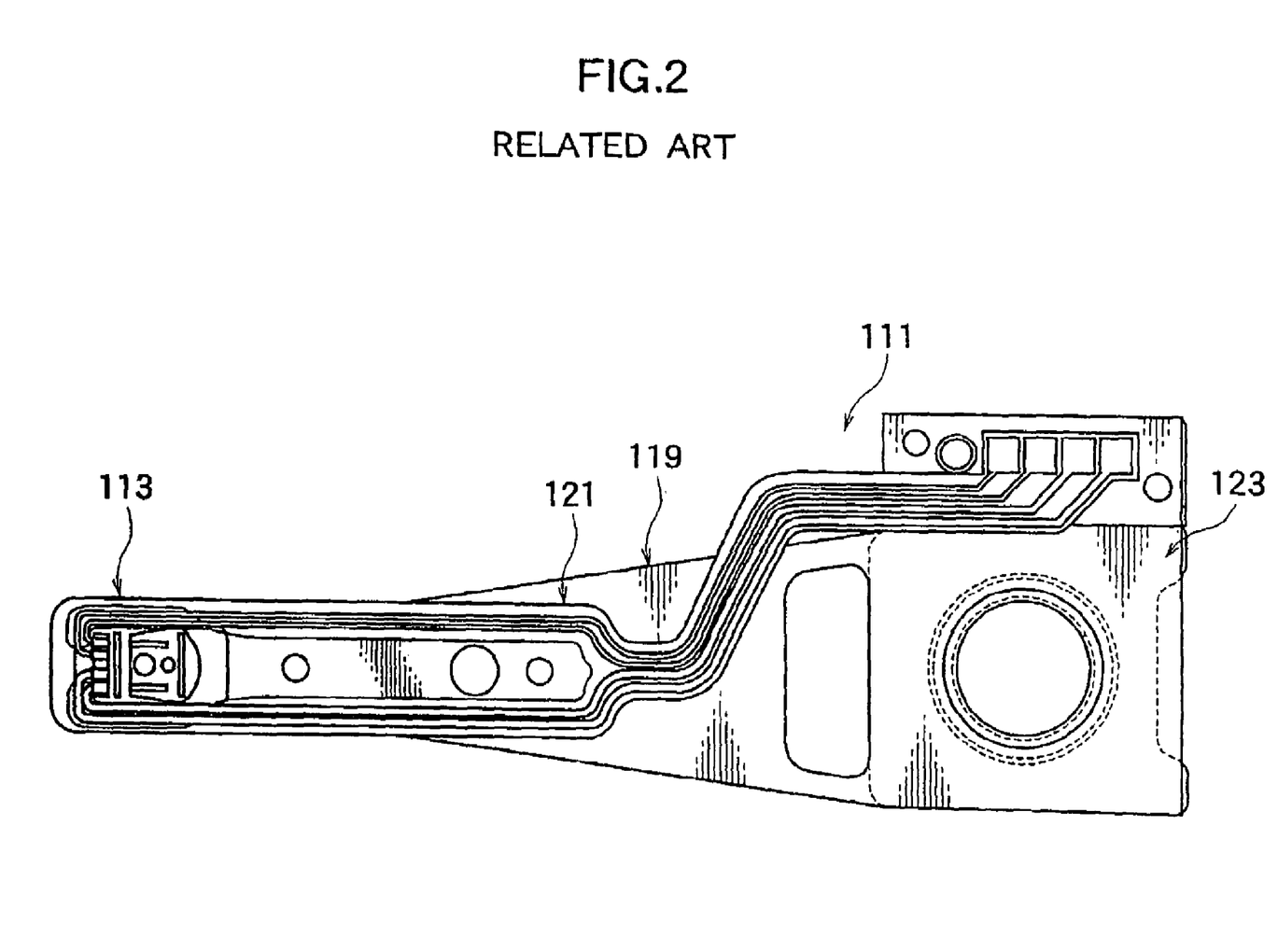
FIG. 2 is a plan view showing one of the head suspensions of FIG. 1 seen from a flexure side.
Figure 3A:
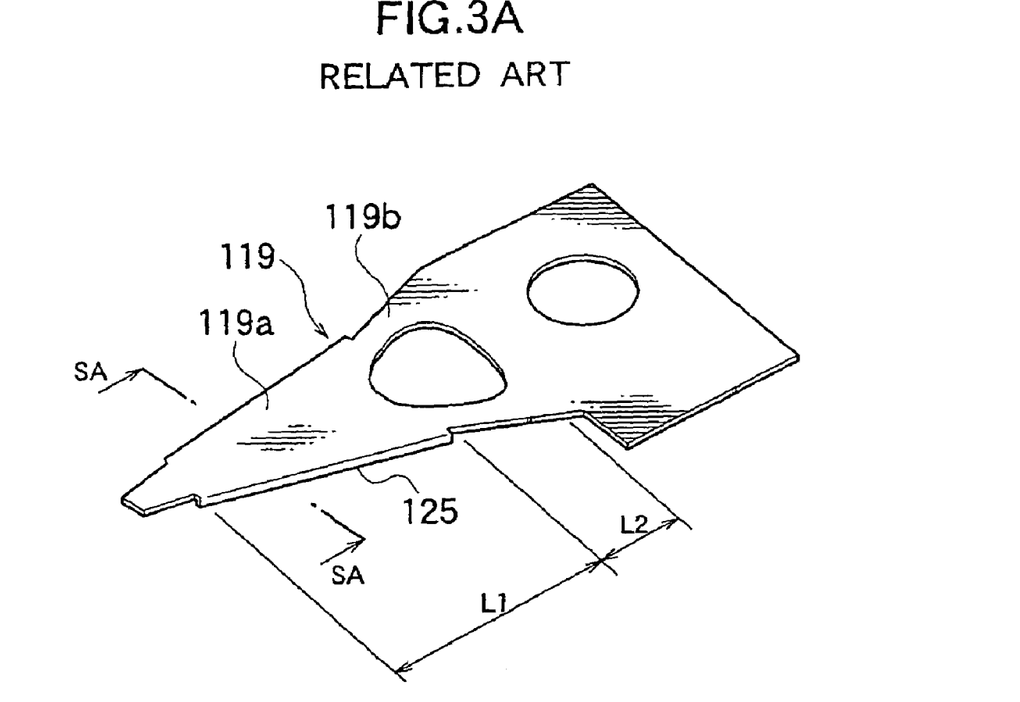
FIG. 3A is a perspective view showing a load beam of the head suspension of FIG. 2.
Figure 3B:
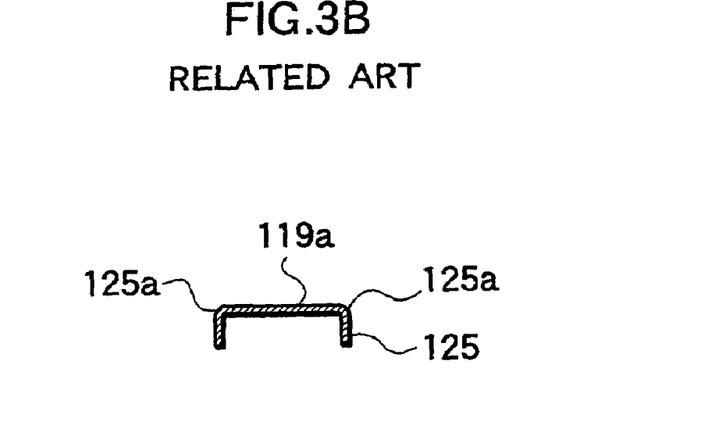
FIG. 3B is a sectional view taken along a line SA-SA of FIG. 3A.

FIGS. 2, 3A, and 3B show the head suspension 111. The head suspension 111 includes a load beam 119 made of a precision thin plate spring, a flexure 121 made of a very thin plate spring fixed to the load beam 119 by, for example, laser welding, and a base plate 123 fixed to a base of the load beam 119 by, for example, laser welding. The base plate 123 is attached to a suspension attaching face of the carriage arm 109.

Recent hard disk drives employ high-density disks and drive the disks at high speed. Such high-density disks involve narrow tracks, and therefore, vibration such as butterfly mode vibration of the head suspension 111 caused by air disturbance results in moving the head 113 away from a track center.

It is important, therefore, to control the amplitudes and frequencies of various resonance modes and air disturbance concerning the head suspensions 111 and carriage arms 109 between the actuator 107 and the sliders 117 in the disk drive 101. The recent high-density, high-speed disks require head suspensions of high rigidity and low spring constant.

To achieve the requirements, the load beam 119 of FIGS. 3A and 3B has a channel 125. The load beam 119 has a rigid part 119a that extends for a length L1 and needs high rigidity and a resilient part 119b that extends for a length L2 and needs a low spring constant. To simultaneously satisfy these needs, the resilient part 119b is thinned and edges of the rigid part 119a are shaped into the channel 125 to compensate the thinness of the rigid part 119a that is restricted by the thinness of the resilient part 119b.

The channel 125 provides another function when the head suspension 111 is installed into the disk drive 101.

Figure 4:
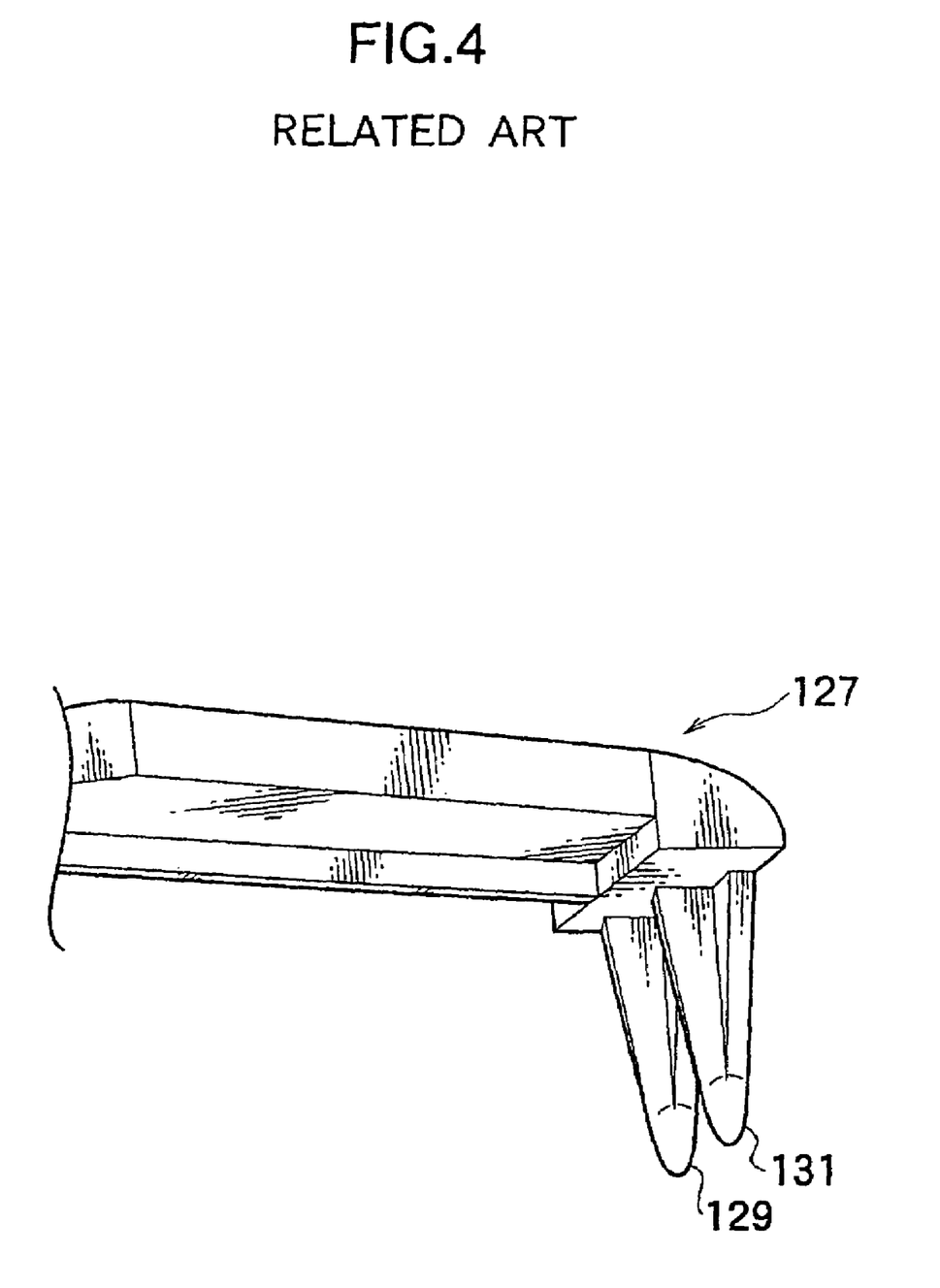
FIG. 4 is a perspective view partly showing a comb serving as a jig to install a head suspension module into a disk drive.
Figure 5:
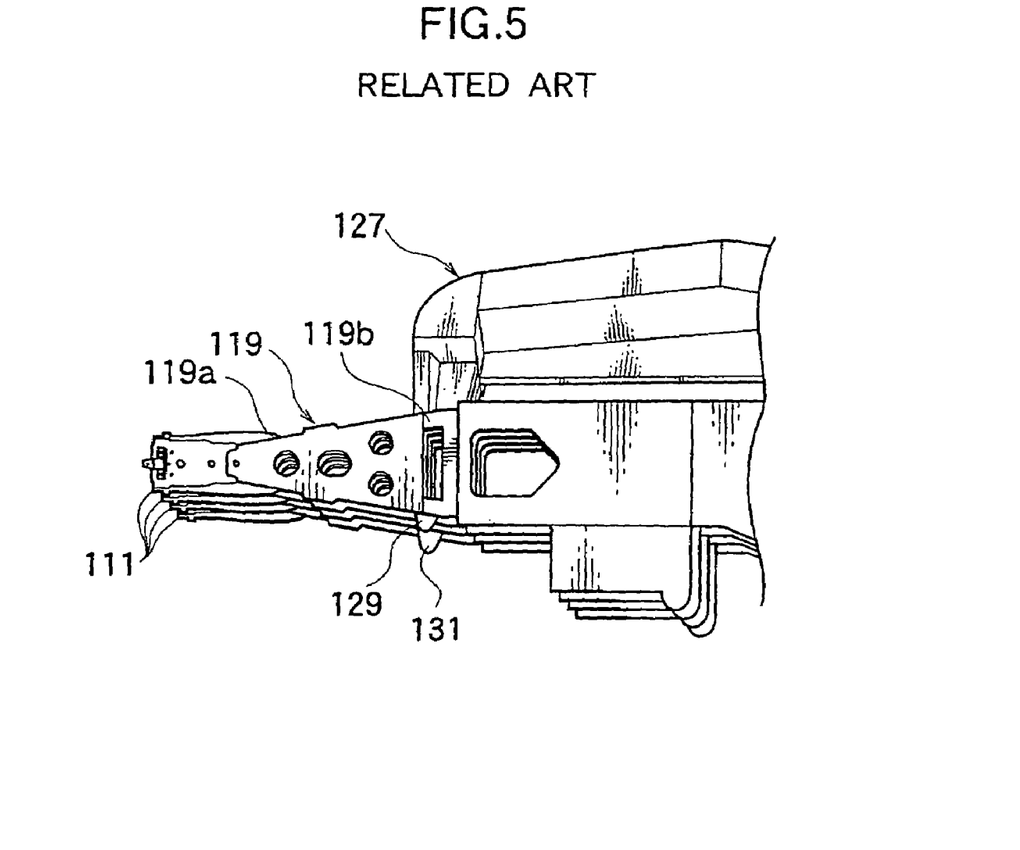
FIG. 5 is a perspective view showing the comb of FIG. 4 inserted into a head suspension module.

FIG. 4 shows a comb 127 used when installing a head suspension module into a disk drive. The head suspension module consists of a plurality of head suspensions arranged at regular intervals. In FIG. 4, the comb 127 has two teeth 129 and 131 corresponding to the number of head suspensions included in the module. FIG. 5 shows an example of the head suspension module. This module consists of four head suspensions 111.

The teeth 129 and 131 of the comb 127 are inserted into the head suspension module as shown in FIG. 5 to maintain a given space between the adjacent sliders 117 (FIG. 1). The comb 127 enables horizontally to insert the head suspensions between the disks 115 (FIG. 1) so that the sliders 117 may face the disks 115. After the head suspension module is fixed at a proper position in the disk drive 101, the comb 127 is removed from the head suspension module. In this way, the comb 127 is used to smoothly insert a module of head suspensions between disks in a disk drive.

When inserting the teeth 129 and 131 of the comb 127 between the head suspensions 111, curves 125a (FIG. 3B) of the channel 125 serve as guides to reduce friction between the load beams 119 and the teeth 129 and 131.

The channel 125, however, causes air disturbance when the disks 115 are rotated at high speed, to flutter the load beams 119.

To solve the problem, this applicant has proposed a head suspension for a disk drive in Japanese Patent Application No. 11-263705. This head suspension simultaneously realizes high rigidity for a rigid part (119a) and a low spring constant for a resilient part (119b) by separating the resilient part from the rigid part and by making the rigid part thicker than the resilient part. The rigid part has no bends, and therefore, causes no air disturbance and load beam fluttering when disks are rotated at high speed.

Figure 6:
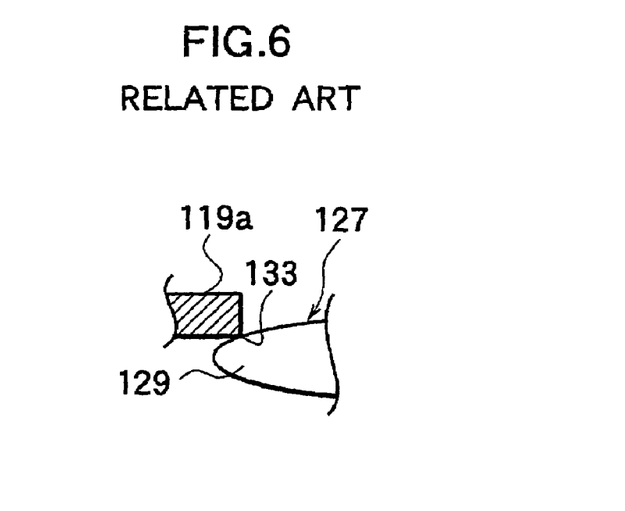
FIG. 6 is a sectional view showing a tooth of the comb of FIG. 4 in contact with a rigid part of a head suspension.

Instead of having no bends, the rigid part of the disclosure has sharp edges 133 as shown in FIG. 6. When the tooth 129 of the comb 127 is inserted between the head suspensions, the edge 133 of the rigid part 119a scrapes the teeth 129, and the scraped dust spreads over the disks 115 to hinder the operation of the disk drive. In addition, the sharp edges 133 quickly wear the teeth of the comb 127, thereby deteriorating the durability of the comb 127.

SUMMARY OF THE INVENTION

The present invention provides a head suspension for a disk drive, capable of minimizing the wear of a comb even if the head suspension has no rigidity-improving bends.

A first aspect of the present invention provides a head suspension for a disk drive, having a base to be attached to a carriage, a load beam having a rigid part and a resilient part supported by the base, to apply load on a data read/write head arranged at a front end of the rigid part, a flexure attached to the load beam and being provided with the head, and a guide face formed on an edge of the rigid part where a jig is inserted, to guide the jig without wearing away the jig. The guide face is formed by providing the edge of the rigid part with an integral thin part that is thinner than the rigid part and bending the thin part, or by partly removing the edge of the rigid part. The jig is inserted into a head suspension module, which is made by arranging the head suspension and other identical head suspensions at regular intervals, such that teeth of the jig slide on the guide faces of the head suspensions to maintain spaces between the rigid parts of the head suspensions, to install the head suspension module into the disk drive such that the heads of the head suspensions face disks in the disk drive.

In the head suspension of the first aspect, a second aspect of the present invention forms the thin part by etching the edge of the rigid part.

In the head suspension of any one of the first and second aspects, a third aspect of the present invention makes an outer face of a bend formed by bending the thin part protrude from a face of the rigid part on which the flexure is arranged.

In the head suspension of the first aspect, a fourth aspect of the present invention partly removes the edge of the rigid part by pressing.

In the head suspension of the first aspect, a fifth aspect of the present invention provides the rigid part with at least three layers including metal plates and a resin layer sandwiched between the metal plates and forms the thin part from one of the metal plates.

In the head suspension of any one of the first, second, and fifth aspects, a sixth aspect of the present invention makes the height after bent of the thin part smaller than the thickness of the rigid part.

According to the first aspect, a plurality of head suspensions are arranged at regular intervals to form a head suspension module. The module is installed into a disk drive by inserting a jig between the rigid parts of the head suspensions such that teeth of the jig slide on the guide faces of the head suspensions to maintain spaces between the rigid parts. The jig enables easily to install the module into the disk drive such that the heads at the front ends of the head suspensions face disks in the disk drive.

The first aspect forms the guide face on the edge of the rigid part where the jig is inserted. When the jig is inserted between the rigid parts of the head suspension module, the jig is guided along the guide faces, to minimize the wearing of the jig, prevent the jig from producing abrasion dust, and keep the disks clean.

Minimizing the wearing of the jig results in improving the durability of the jig. The guide face is formed by providing the edge of the rigid part with an integral thin part that is thinner than the rigid part and bending the thin part, or by partly removing the edge of the rigid part. The guide face is easy to form.

In addition to the effects of the first aspect, the second aspect easily and precisely forms the thin part of the rigid part by etching the edge of the rigid part. The thin part is easy to bend to form the guide face. This results in extending the service life of an apparatus used to form the guide face.

In addition to the effects of the first and second aspects, the third aspect makes an outer face of a bend formed by bending the thin part protrude from a face of the rigid part on which the flexure is arranged. When the jig is inserted, the jig moves along the outer face of the bend, to keep a space between the jig and the surface of the rigid part, thereby protecting conductors formed on the flexure.

In addition to the effects of the first aspect, the fourth aspect partly removes the edge of the rigid part by pressing, thereby easily and correctly forming the guide face. The fourth aspect forms no protrusion on the edges of the rigid part, to cause no air disturbance when the disks are rotated at high speed in the disk drive. Namely, the fourth aspect surely prevents vibration of the head suspension.

In addition to the effects of the first aspect, the fifth aspect provides the rigid part of the head suspension with at least three layers including metal plates and a resin layer sandwiched between the metal plates. The thin part of the rigid part is made from one of the metal plates, to easily form the guide face. The three-layered structure of the rigid part is effective to reduce the weight of the head suspension and improve the rigidity thereof.

In addition to the effects of the first, second, and fifth aspects, the sixth aspect makes the height after bent of the thin part of the rigid part smaller than the thickness of the rigid part. As a result, the thin part after bent causes no air disturbance when the disks are rotated at high speed in the disk drive, thereby preventing vibration of the head suspension.

DETAILED DESCRIPTION OF EMBODIMENTS

First Embodiment

Figure 7:
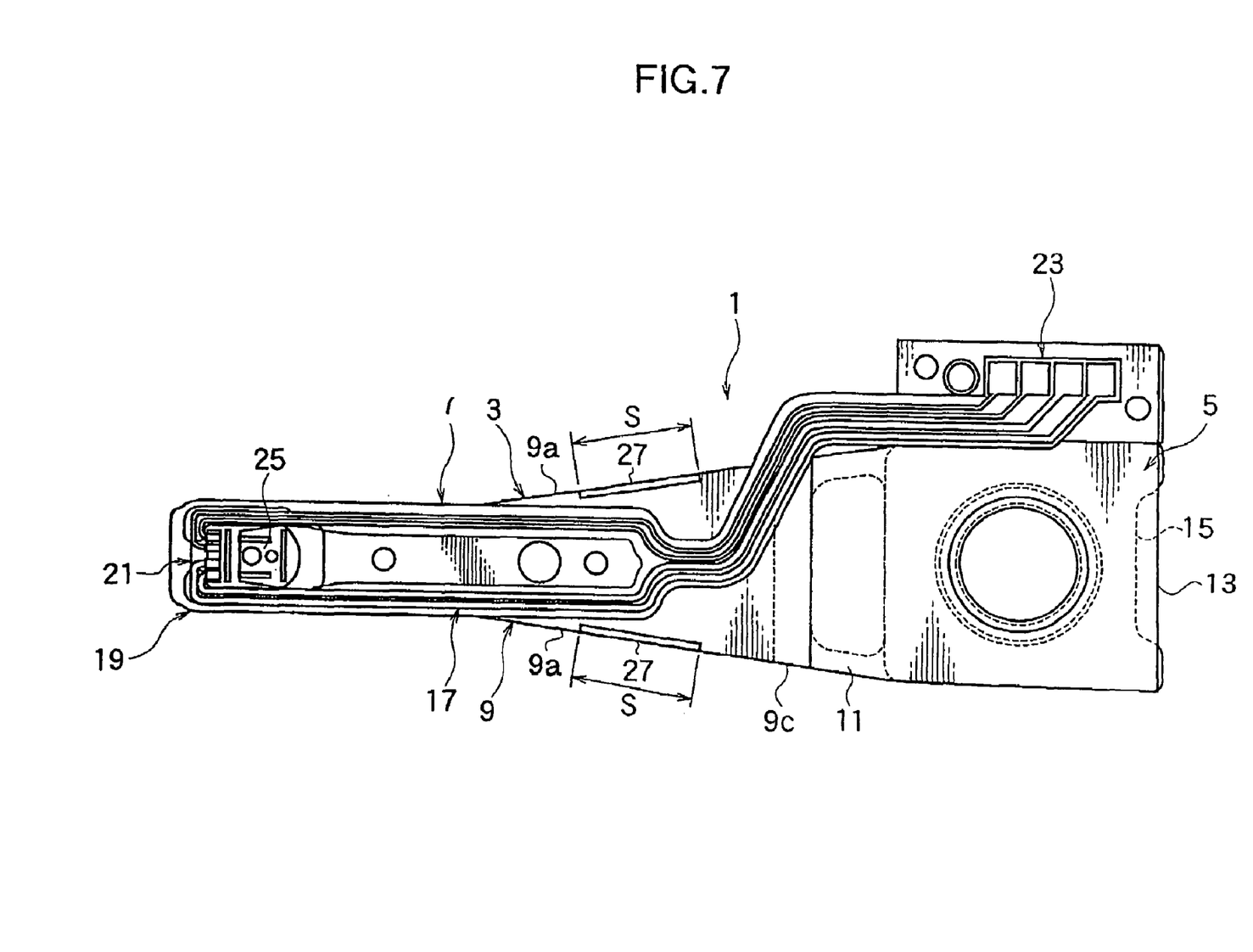
FIG. 7 is a plan view showing a head suspension seen from a flexure side according to a first embodiment of the present invention.

FIG. 7 is a plan view showing a head suspension 1 for a disk drive according to the first embodiment of the present invention. The head suspension 1 includes a load beam 3, a base 5, and a flexure 7.

The load beam 3 has a rigid part 9 and a resilient part 11. The rigid part 9 is made of, for example, stainless steel and is relatively thick, for example, 0.1 mm thick.

The resilient part 11 is independent of the rigid part 9 and is made of, for example, a thin stainless steel rolled plate. The resilient part 11 has a precision low spring constant that is lower than that of the rigid part 9. The thickness of the resilient part 11 is, for example, t=0.040 mm. An end of the resilient part 11 is fixed to a rear end 9c of the rigid part 9 by, for example, laser welding. The other end of the resilient part 11 forms an integral reinforcing plate 13.

The base 5 has a base plate 15, which is laid over the reinforcing plate 13 and fixed thereto by, for example, laser welding. Namely, the base plate 15 is reinforced with the reinforcing plate 13, to form the base 5.

The flexure 7 includes a metal base made of, for example, a resilient thin stainless rolled plate. An insulating layer is formed on the metal base, and conductors 17 are formed on the insulating layer. The flexure 7 is fixed to the rigid part 9 by, for example, laser welding. One ends of the conductors 17 are electrically connected to terminals 21 of a head 19, and the other ends thereof are electrically connected to terminals 23 of the base 5. The head 19 has a slider 25.

The rigid part 9 has longitudinal edges 9a. Each of the edges 9a is provided with a guide face 27 at a position where a tooth of a comb (such as the tooth 129 of the comb 127 of FIG. 4) is inserted. According to the first embodiment, the guide face 27 is formed in a range S along the edge 9a in front of the resilient part 11. The guide face 27 of the first embodiment is formed on each edge 9a to maintain the horizontal balance of the rigid part 9. The guide face 27 may be formed on one edge 9a where the comb is inserted.

Figure 8:
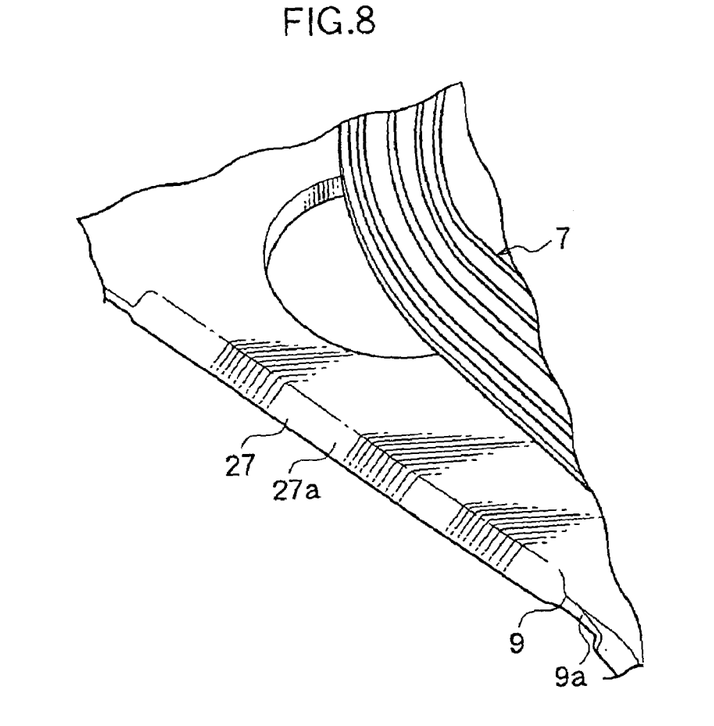
FIG. 8 is an enlarged perspective view showing a guide face of the head suspension of FIG. 7 seen from the flexure side.
Figure 9:
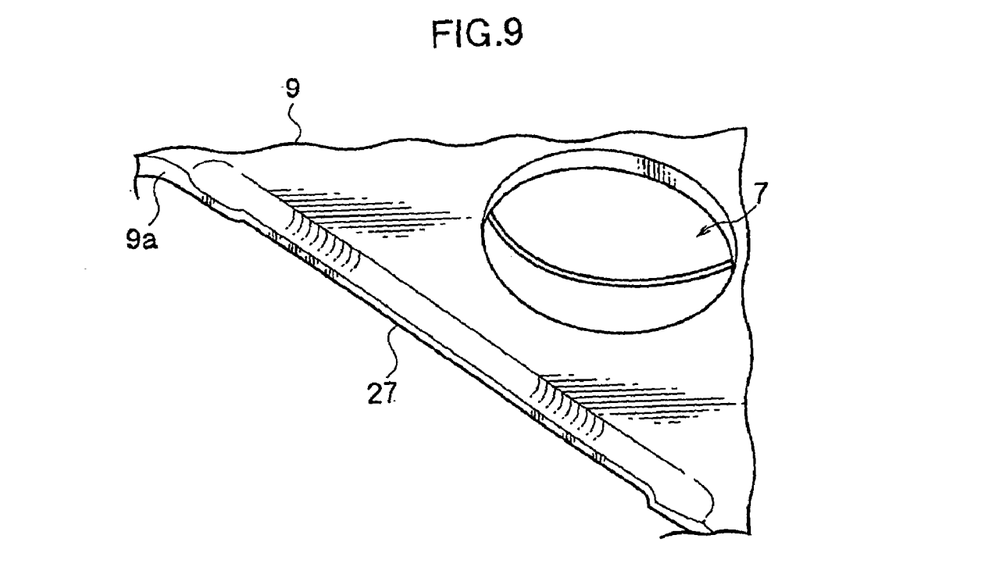
FIG. 9 is an enlarged perspective view showing the guide face seen from the opposite side of FIG. 8.

FIGS. 8 and 9 are enlarged perspective views showing the guide face 27, in which FIG. 8 is a view seen from the flexure 7 side and FIG. 9 is a view seen from the opposite side. The guide face 27 is formed on the edge 9a of the rigid part 9.

Figure 10:
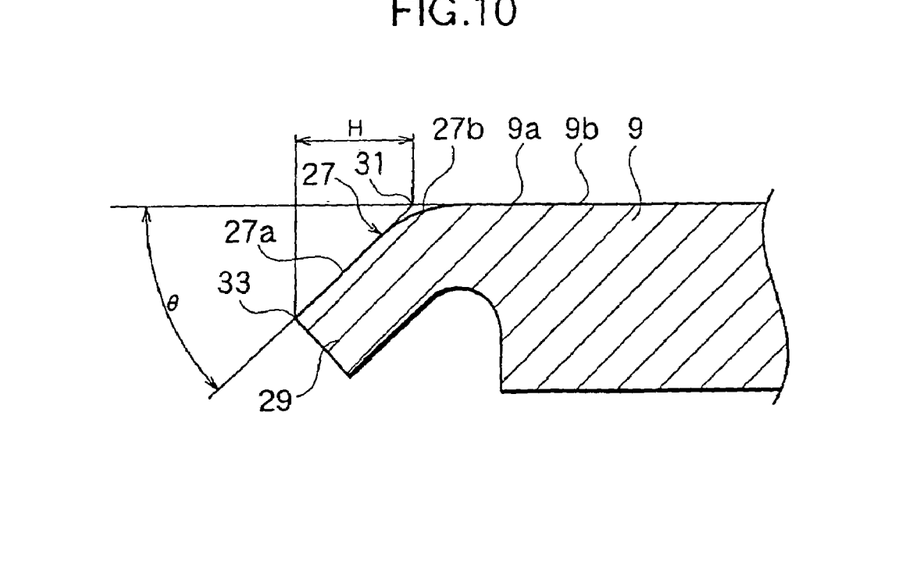
FIG. 10 is an enlarged sectional view showing the guide face of FIG. 7.

FIG. 10 is a sectional view showing the guide face 27. According to the first embodiment, each edge 9a of the rigid part 9 is provided with a thin part 29 thinner than the rigid part 9, and the thin part 29 is bent to form the guide face 27. The guide face 27 has a slant 27a and a curve 27b. The curve 27b smoothly connects the slant 27a to a surface 9b of the rigid part 9.

An inclination angle of the slant 27a relative to the surface 9b is, for example, θ=40°. An extension of the slant 27a and an extension of the surface 9b form an intersection 31. The intersection 31 is distanced from a front end 33 of the thin part 29 by, for example, H=0.05 mm. The inclination θ and distance H are optional. The height of the bend from the surface 9b is lower than the height of the rigid part 9. The height of the bend from the surface 9b may be greater than the height of the rigid part 9.

Figure 11A:
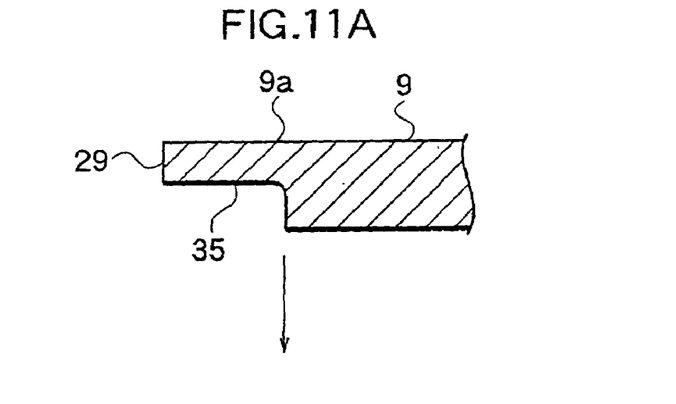
FIG. 11A shows a thin part formed on the rigid part of the head suspension according to the first embodiment.
Figure 11B:
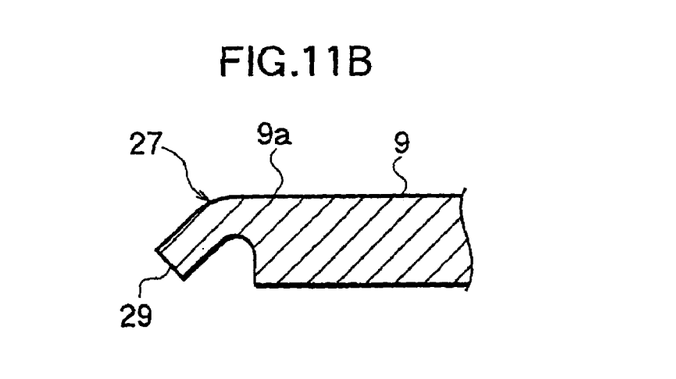
FIG. 11B shows a guide face formed from the thin part of FIG. 11A.

FIGS. 11A and 11B show a method of forming the guide face 27. In FIG. 11A, the edge 9a of the rigid part 9 is etched to form a recess 35 and the thin part 29 thinner than the rigid part 9. In FIG. 11B, a press is used to smoothly bend the thin part 29 to form the guide face 27 along the edge 9a. In this way, the guide face 27 is easily and correctly formed by etching and pressing. The pressing needs only small force, to maintain proper operation of the press for a long time.

A plurality of head suspensions 1 each having the guide faces 27 are assembled into a head suspension module, and the module is installed into a disk drive by inserting the comb 127 into the rigid parts 9 as shown in FIG. 5. At this time, the teeth of the comb 127 contact with the slants 27a, enter between the rigid parts 9, gradually widen spaces between the rigid parts 9, slide on the slants 27a and curves 27b, and move over the surfaces 9b of the rigid parts 9. As a result, the teeth of the comb 127 are not rubbed by the edges of the rigid parts 9, to thereby are not or slightly worn by the edges of the rigid parts 9.

The head suspension module is installed as shown in FIG. 1 so that the sliders 25 of the heads 19 face the disks 115. In this case, the comb 127 produces substantially no abrasion dust due to the guide faces 27, to keep the disks 115 clean and improve the durability of the comb 127.

According to the first embodiment, the rigid part 9 is thick and highly rigid, and the edges 9a of the rigid part 9 are provided with the thin parts 29 to easily form the guide faces 27.

According to the first embodiment, the rigid part 9 maintains high rigidity, and at the same time, the separate resilient part 11 realizes a low spring constant. In the load beam 3, the material and thickness of the rigid part 9 are not restricted by those of the resilient part 11. Namely, the rigid part 9 and resilient part 11 may have individual materials and thicknesses, to satisfy requirements for the head suspension 1.

The rigid part 9 realizes high rigidity without a channel shape, and the height after bent of the thin part 29 is lower than the height of the rigid part 9. As a result, the rigid part 9 shows low air resistance. This minimizes air disturbance when the disks 115 are rotated at high speed and prevents the fluttering of the head suspension 1.

Second Embodiment

Figure 12:
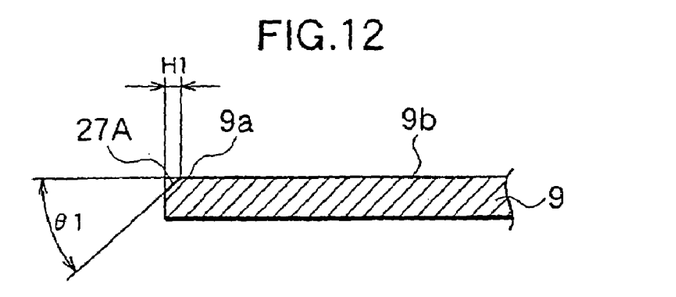
FIG. 12 is a sectional view showing a rigid part of a head suspension for a disk drive according to a second embodiment of the present invention.
Figure 13A:
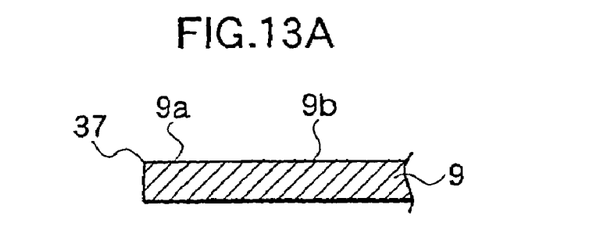
FIG. 13A is a sectional view showing an edge of the rigid part of the second embodiment.
Figure 13B:
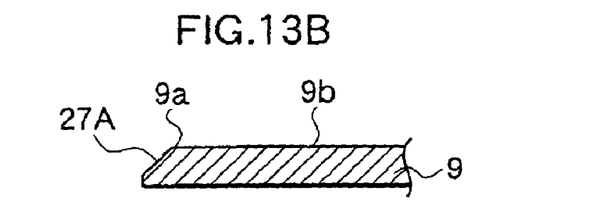
FIG. 13B is a sectional view showing a guide face formed on the edge of FIG. 13A.

FIGS. 12, 13A, and 13B show a rigid part 9 of a head suspension for a disk drive according to the second embodiment of the present invention. The second embodiment partly removes each edge 9a of the rigid part 9 and forms a guide face 27A. The guide face 27A has an inclination angle of, for example, θ1=40° relative to a surface 9b of the rigid part 9. The width of the guide face 27A is, for example, H1=0.05 mm. The inclination angle θ1 and width H1 are optional.

FIGS. 13A and 13B show a method of forming the guide face 27A. In FIG. 13A, a press is used to remove an edge corner 37 of the rigid part 9, thereby forming the guide face 27A as shown in FIG. 13B.

The guide face 27A of the second embodiment provides the same effects as the guide face 27 of the first embodiment. The second embodiment forms the guide face 27A by removing the edge corner 37 without bending. Accordingly, the guide face 27A is easier to form than the guide face 27 of the first embodiment. The guide face 27A has no bend, and therefore, is free from air disturbance and surely prevents vibration of the head suspension. The guide face 27A formed by pressing is advantageous in maintaining the weight balance of the head suspension even if the guide face 27A is formed on one edge of the rigid part 9.

Removing the edge corner 37 may be carried out by etching. The guide face 27A may have a curve smoothly connected to the surface 9b of the rigid part 9.

Third Embodiment

Figure 14A:
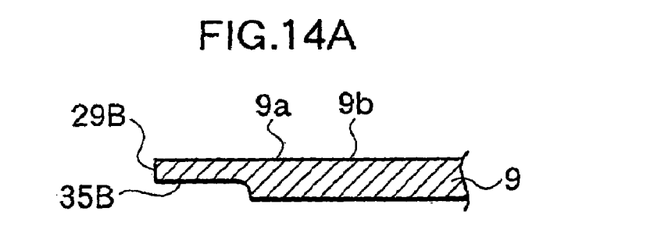
FIG. 14A is a sectional view showing a thin part formed on a rigid part of a head suspension for a disk drive according to a third embodiment of the present invention.

FIGS. 14A and 14B show a rigid part 9 of a head suspension for a disk drive according to the third embodiment of the present invention. In FIG. 14A, each edge 9a of the rigid part 9 is etched to form a recess 35B and a thin part 29B thinner than the rigid part 9.

Figure 14B:
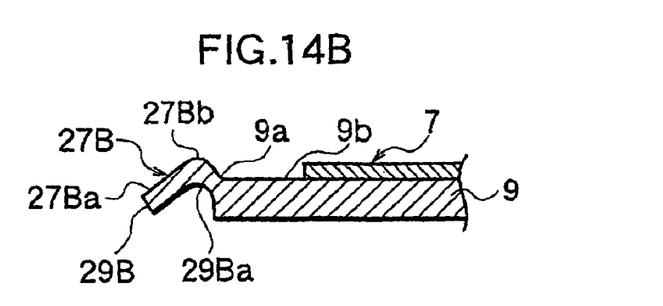
FIG. 14B is a sectional view showing a guide face formed from the thin part of FIG. 14A.

In FIG. 14B, a press is used to bend the thin part 29B, to form a guide face 27B having a slant 27Ba and a curve 27Bb. The height after bent of the thin part 29B is set like that of the thin part 29 of the first embodiment. The curve 27Bb is an outer face of a bend 29Ba of the thin part 29B and protrudes from the surface 9b of the rigid part 9. According to the third embodiment, the height of the protrusion of the curve 27Bb from the surface 9b is equal to or greater than the height of a flexure 7 arranged on the surface 9b. The height of the protrusion of the curve 27Bb from the surface 9b, however, is optional.

The third embodiment provides substantially the same effects as the first embodiment. According to the third embodiment, the curve 27Bb protrudes from the surface 9b. A tooth of a comb (for example, the tooth 129 of the comb 127 of FIG. 4) moves on the curve 27Bb and keeps a space from the surface 9b, thereby protecting conductors formed on the flexure 7. If the height of the protrusion of the curve 27Bb from the surface 9b is equal to or greater than the height of the flexure 7, the conductors on the flexure 7 are surely protected.

Fourth Embodiment

Figure 15:
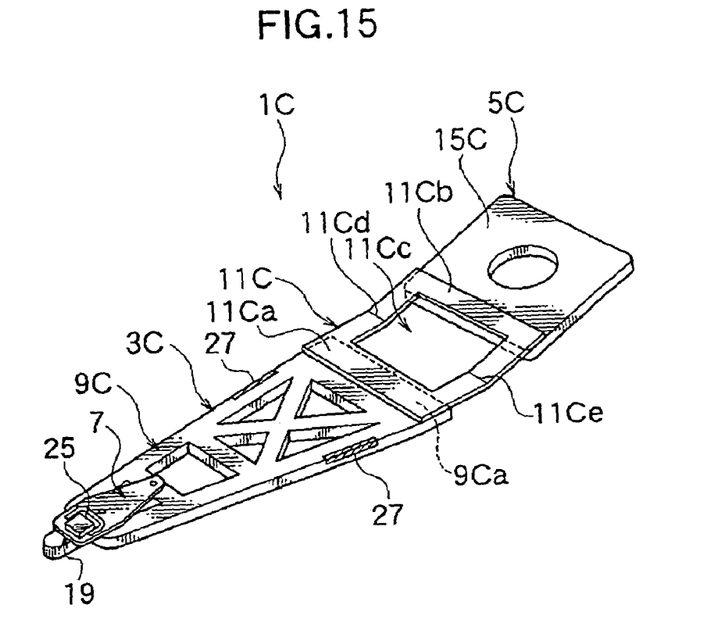
FIG. 15 is a perspective view showing a head suspension for a disk drive according to a fourth embodiment of the present invention.

FIG. 15 is a perspective view showing a head suspension 1C for a disk drive according to the fourth embodiment of the present invention. In FIG. 15, parts corresponding to those of the first embodiment are represented with like reference numerals.

The head suspension 1C has a load beam 3C and a base 5C. The load beam 3C includes a rigid part 9C and a resilient part 11C having a rectangular frame shape. The base 5C consists of only a base plate 15C. An end 11Ca of the resilient part 11C is laid on an end 9Ca of the rigid part 9C and is fixed thereto by, for example, laser welding. Another end 11Cb of the resilient part 11C is laid on a front end of the base plate 15C and is fixed thereto by, for example, laser welding. The resilient part 11C has an opening 11Cc and sides 11Cd and 11Ce to provide a low spring constant.

The rigid part 9C has guide faces 27 where a tooth of a comb (such as the tooth 129 of the comb 127 of FIG. 4) is inserted. The fourth embodiment forms the guide face 27 on each edge of the rigid part 9C to maintain the horizontal weight balance of the head suspension 1C. The guide face 27 may be formed only on one edge of the rigid part 9C where a tooth of the comb is inserted. The guide face 27 may be any one of the guide faces of the second to third embodiments.

The fourth embodiment provides the same effects as the first to third embodiments.

Fifth Embodiment

Figure 16:
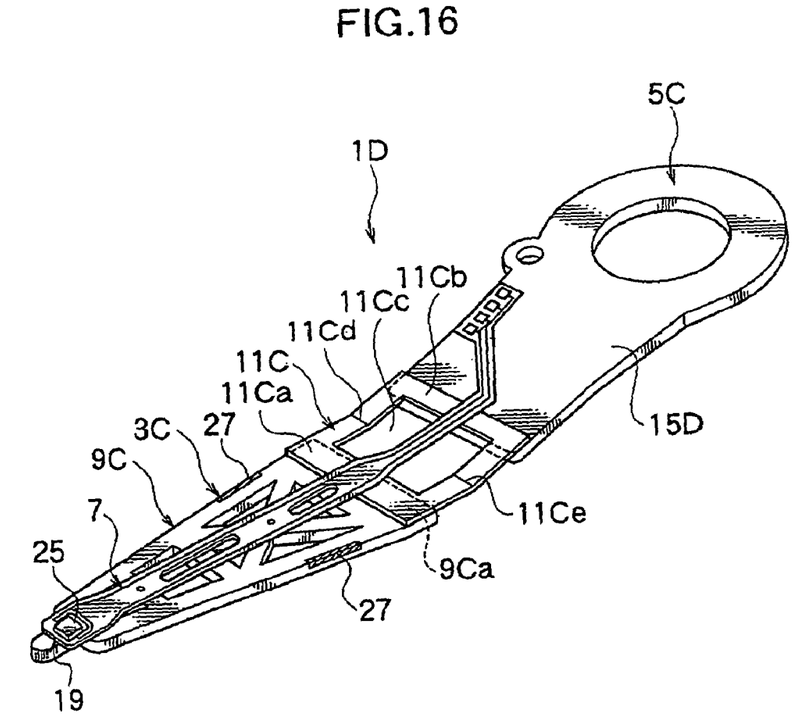
FIG. 16 is a perspective view showing a head suspension for a disk drive according to a fifth embodiment of the present invention.

FIG. 16 is a perspective view showing a head suspension 1D for a disk drive according to the fifth embodiment of the present invention. In FIG. 16, parts corresponding to those of FIG. 15 are represented with like reference numerals.

The head suspension 1D has a base plate 15D that is longer than the base plate 15C of FIG. 15. The base plate 15D also serves as a carriage arm (109 of FIG. 1).

A guide face 27 is formed on each edge of a rigid part 9C of the head suspension 1D, to provide the same effects as the fourth embodiment. The guide face 27 may be any one of the guide faces of the first to third embodiments.

Sixth Embodiment

Figure 17:
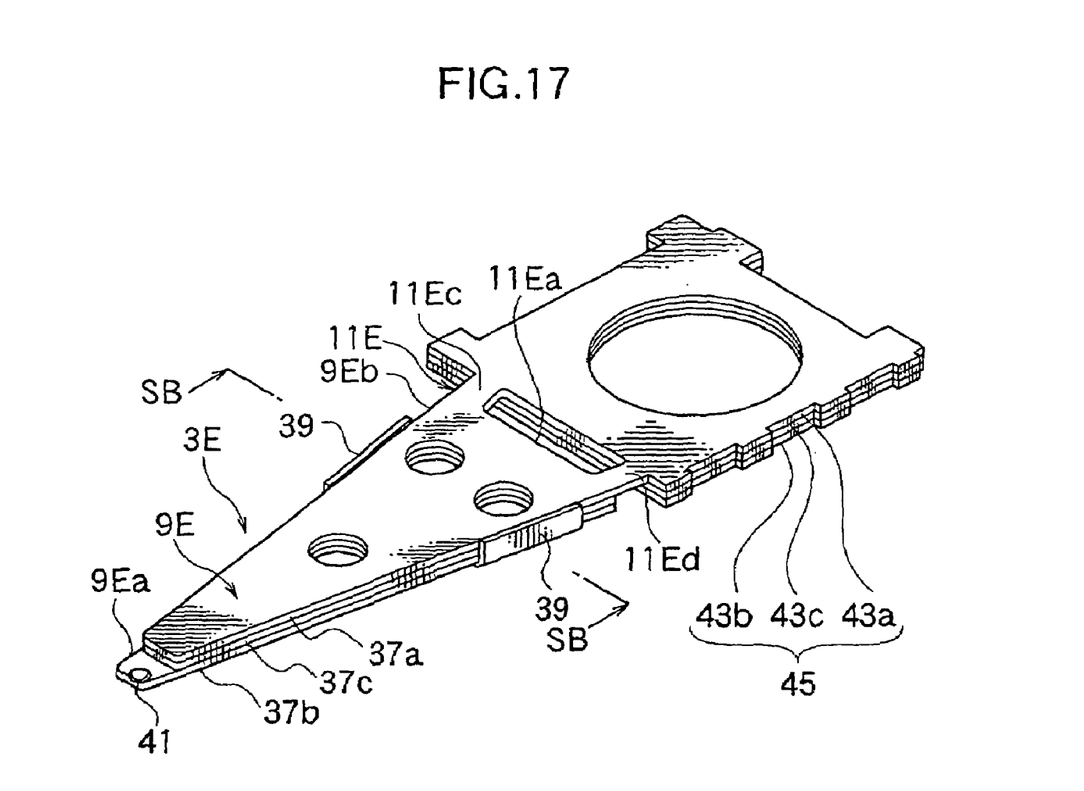
FIG. 17 is a perspective view showing a load beam of a head suspension for a disk drive according to a sixth embodiment of the present invention.
Figure 18:
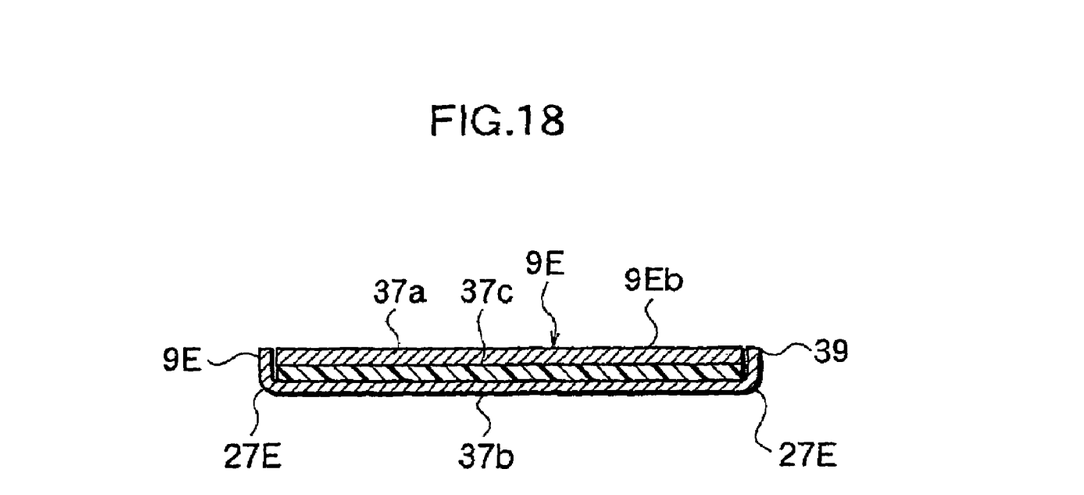
FIG. 18 is a sectional view taken along a line SB-SB of FIG. 17.

FIG. 17 is a perspective view showing a load beam 3E of a head suspension for a disk drive according to the sixth embodiment of the present invention, and FIG. 18 is a sectional view taken along a line SB-SB of FIG. 17.

In FIG. 17, only the load beam 3E proper is shown and other parts including a flexure are omitted. The load beam 3E has a rigid part 9E and a resilient part 11E. The rigid part 9E has substantially a triangle shape with a base end 9Eb gradually narrowing toward a front end 9Ea. The thickness of the rigid part 9E is, for example, t=100 μm.

Referring to FIGS. 17 and 18, the rigid part 9E has a three-layer structure with metal plates 37a and 37b sandwiching a resin layer 37c and bonded each other. The metal plates 37a and 37b are made of, for example, stainless steel (SUS). The thickness of the metal plate 37a is, for example, t=38 μm, and the thickness of the metal plate 37b is, for example, t=20 μm.

The resin layer 37c is a resin plate made of, for example, polyimide (PI) resin or epoxy resin. The thickness of the resin layer 37c is, for example, t=42 μm. The total thickness of the metal plates 37a and 37b and resin layer 37c is set to be 100 μm. These thicknesses are only examples. Depending on rigidity set for the rigid part 9E, the individual thicknesses of the metal plates 37a and 37b and resin layer 37c and the total thickness thereof are properly set.

The rigid part 9E has bends 39, which are integral with the metal plate 37b. Each bend 39 is lower than the rigid part 9E. The bends 39 are formed by preparing three layers (37a, 37b, 37c) having protrusions corresponding to the bends 39, etching off the protrusions on the metal plate 37a and resin layer 37c to leave the protrusions on the metal plate 37b, and bending the protrusions on the metal plate 37b by press.

The bends 39 provide guide faces 27E. According to the sixth embodiment, the guide faces 27E are formed on both edges of the rigid part 9E to maintain the horizontal weight balance of the load beam 3E. The guide face 27E may be formed only on one edge of the rigid part 9E where a tooth of a comb (such as the tooth 129 of the comb 127 of FIG. 4) is inserted.

According to the sixth embodiment, the height of the bend 39 is equal to a surface 9Eb of the rigid part 9E. The height of the bend 39 may be lower than the surface 9Eb, i.e., smaller than the thickness of the rigid part 9E. The height of the bend 39 may be greater than the thickness of the rigid part 9E.

The front end 9Ea of the rigid part 9E consists of only the metal plate 37b and has a dimple 41. The front end 9Ea is formed by, for example, etching off the metal plate 37a and resin layer 37c.

The resilient part 11E is integral with the metal plate 37a at an end of the rigid part 9E. Namely, the resilient part 11E has a single-layer structure. The resilient part 11E is made of, for example, stainless steel. The thickness of the resilient part 11E is, for example, t=38 μm. The resilient part 11E has an opening 11Ea and sides 11Ec and 11Ed to provide a low spring constant.

Opposite to the rigid part 9E, the resilient part 11E is integral with a reinforcing metal plate 43a for reinforcing a base. The metal plate 43a is made of, for example, stainless steel, and the thickness thereof is, for example, t=38 μm. The metal plate 43a and another reinforcing metal plate 43b sandwich a resin layer 43c and are bonded each other to form a three-layer reinforcing part 45.

The metal plates 43a and 43b and resin layer 43c of the reinforcing part 45 resemble the metal plates 37a and 37b and resin layer 37c of the rigid part 9E. The metal plate 43b is made of stainless steel, and the thickness thereof is, for example, t=20 μm. The resin layer 43c is made of polyimide resin or epoxy resin, and the thickness thereof is, for example, t=42 μm.

The reinforcing part 45 is attached to a base plate and fixed thereto by, for example, laser welding. The base plate is attached to a carriage arm.

The guide faces 27E of the sixth embodiment provide the same effects as the first to fifth embodiments. The height of each bend 39 is substantially equal to the height of the surface 9Eb of the rigid part 9E, and therefore, causes no air disturbance and prevents vibration of the load beam 3E.

According to the sixth embodiment, the bends 39 are formed only on the metal plate 37b, and therefore, are easy to form with the dimple 41.

The rigid part 9E has the three-layer structure interposing the resin layer 37c, to remarkably improve the rigidity of the rigid part 9E. The interposed resin layer 37c provides a damper effect. The resilient part 11E is made of a single plate to easily provide a low spring constant. As a result, the head suspension of the sixth embodiment realizes a high resonance frequency and the damper effect, to surely prevent the fluttering of the head suspension.

The three-layer reinforcing part 45 interposing the resin layer 43c provides high rigidity to surely attach the base to a carriage arm. The load beam 3E as a whole is a three-layer structure with the interposed resin layers 37c and 43c, to greatly reduce the weight of the head suspension.

Figure 19:
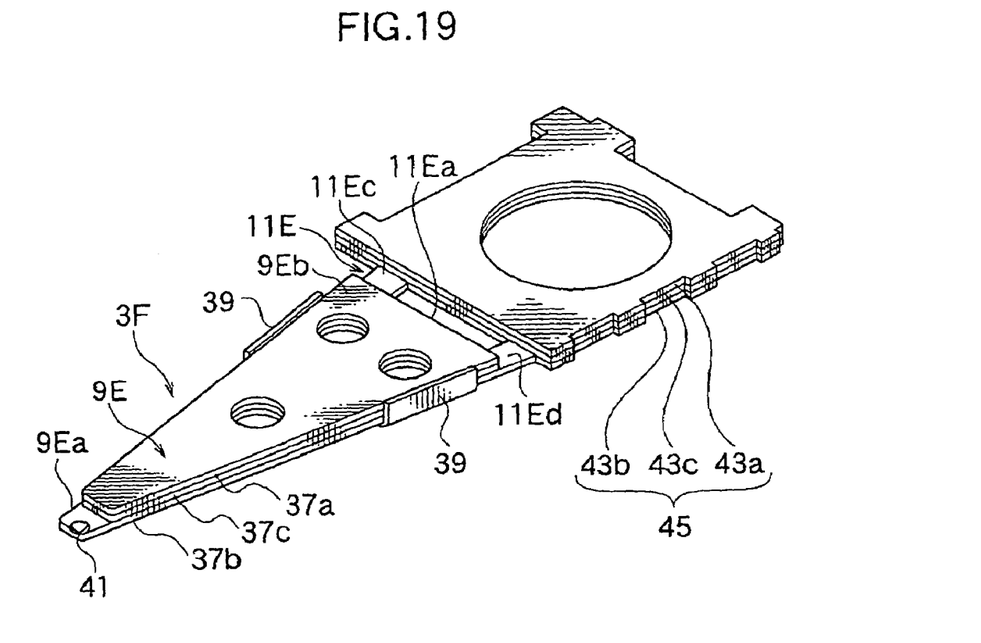
FIG. 19 is a perspective view showing a load beam of a head suspension for a disk drive according to a modification of the sixth embodiment.

Each bend 39 may be inclined so that the guide face 27E may have a slant and a curve. The resilient part 11E may be integral with the metal plate 37b as shown in FIG. 19. In this case, the thickness of the metal plate 37b is equalized with the thickness of the resilient part 11E.

According to the sixth embodiment, the resilient part 11E may have a two-layer structure consisting of a metal plate and a resin layer, or a three-layer structure consisting of two metal plates sandwiching a resin layer. In this case, the rigid part 9E or the rigid part 9E and reinforcing part 45 may have a multilayer structure made of metal and resin layers whose number is greater than the number of layers of the resilient part 11E.

Seventh Embodiment

Figure 20:
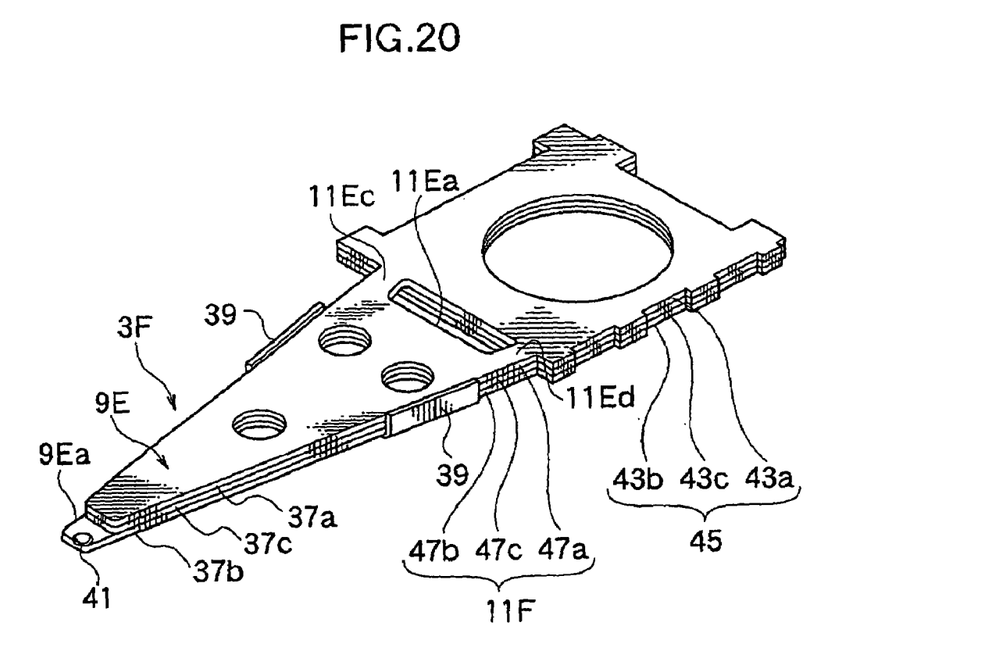
FIG. 20 is a perspective view showing a load beam of a head suspension for a disk drive according to a seventh embodiment of the present invention.

FIG. 20 is a perspective view showing a load beam 3F of a head suspension for a disk drive according to the seventh embodiment of the present invention. In FIG. 20, parts corresponding to those of the sixth embodiment are represented with like reference numerals.

In the load beam 3F, a rigid part 9E and a reinforcing part 45 have each a three-layer structure like the sixth embodiment. In addition, a resilient part 11F also has a three-layer structure consisting of metal plates 47a and 47b sandwiching a resin layer 47c. The metal plate 47a is integral with a metal plate 37a and reinforcing metal plate 43a, and these metal plates have the same thickness. The metal plate 47b is integral with a metal plate 37b and a reinforcing metal plate 43b, and these metal plates have the same thickness. The resin layer 47c is integral with resin layers 37c and 43c, and these resin layers have the same thickness.

The seventh embodiment provides the same effects as the sixth embodiment.

What is claimed is:

1. A head suspension for a disk drive, comprising:
a base to be attached to a carriage;
a load beam having a rigid part and a resilient part supported by the base, to apply load on a data read/write head arranged at a front end of the rigid part;
a flexure attached to the load beam and provided with the head; and
guide faces formed on opposing edges of the rigid part, the guide faces being formed by providing the edges of the rigid part with thin parts thinner than adjacent portions of the rigid part, said adjacent portions being adjacent to the thin parts in an across-the-width direction of the rigid part; and
said flexure including conductors that are disposed on and extend over said rigid part between said guide faces and to said base, said flexure and said conductors being disposed so as to not cross over said guide faces and said guide faces being free of said conductors passing thereover.

2. The head suspension of claim 1, wherein the guide faces are formed by pressing material of the rigid part.

* * * * *